United States Patent
Aycock et al.

(10) Patent No.: US 11,386,648 B2
(45) Date of Patent: *Jul. 12, 2022

(54) POLARIZATION-BASED MAPPING AND PERCEPTION METHOD AND SYSTEM

(71) Applicant: Polaris Sensor Technologies, Inc., Huntsville, AL (US)

(72) Inventors: Todd M. Aycock, Huntsville, AL (US); David B. Chenault, Huntsville, AL (US); John S. Harchanko, Huntsville, AL (US)

(73) Assignee: Polaris Sensor Technologies, Inc., Huntsville, AL (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/552,441

(22) Filed: Aug. 27, 2019

(65) Prior Publication Data

US 2020/0012841 A1    Jan. 9, 2020

Related U.S. Application Data

(63) Continuation of application No. 15/450,948, filed on Mar. 6, 2017, now Pat. No. 10,395,113, which is a
(Continued)

(51) Int. Cl.
| | |
|---|---|
| *G06V 20/13* | (2022.01) |
| *G06K 9/62* | (2022.01) |
| *H04N 9/64* | (2006.01) |
| *G01V 8/10* | (2006.01) |
| *G01J 4/04* | (2006.01) |

(Continued)

(52) U.S. Cl.
CPC ............ *G06V 20/13* (2022.01); *G01J 4/04* (2013.01); *G01V 8/10* (2013.01); *G02B 5/201* (2013.01); *G02B 27/288* (2013.01); *G06K 9/6267* (2013.01); *G06V 10/143* (2022.01); *G06V 10/147* (2022.01); *G06V 10/60* (2022.01); *G06V 20/10* (2022.01); *G06V 40/166* (2022.01); *H04N 9/646* (2013.01)

(58) Field of Classification Search
CPC ............. G06K 9/0063; G06K 9/2018; G06K 9/00664; G06K 9/00255; G06K 9/6267; G06K 9/209; G06K 9/4661; G02B 5/201; G02B 27/288; H04N 9/646; G01V 8/10; G01J 4/04

See application file for complete search history.

(56) References Cited

U.S. PATENT DOCUMENTS

| | | | | |
|---|---|---|---|---|
| 7,034,938 B1 * | 4/2006 | Miles | ................. | G01J 3/2823 |
| | | | | 356/327 |
| 8,217,368 B2 * | 7/2012 | Meyers | ................. | G01N 21/21 |
| | | | | 250/459.1 |

(Continued)

*Primary Examiner* — Aaron W Carter
(74) *Attorney, Agent, or Firm* — Angela Holt; Bradley Arant Boult Cummings LLP

(57) ABSTRACT

In a method of using a polarimeter for improved mapping and perception of objects on the ground, the polarimeter records raw image data to obtain polarized images of an area. The raw image data is processed to form processed images. The processed images are enhanced, and objects are detected and tracked. The polarimeter may be in a vehicle on the ground or in the air.

10 Claims, 7 Drawing Sheets
(5 of 7 Drawing Sheet(s) Filed in Color)

Related U.S. Application Data continuation-in-part of application No. 14/836,549, filed on Aug. 26, 2015, now Pat. No. 9,589,195, which is a continuation-in-part of application No. 14/602,823, filed on Jan. 22, 2015, now Pat. No. 10,311,285.

(60) Provisional application No. 62/041,778, filed on Aug. 26, 2014, provisional application No. 61/930,272, filed on Jan. 22, 2014.

(51) Int. Cl.
| | |
|---|---|
| *G02B 5/20* | (2006.01) |
| *G02B 27/28* | (2006.01) |
| *G06V 10/60* | (2022.01) |
| *G06V 10/143* | (2022.01) |
| *G06V 10/147* | (2022.01) |
| *G06V 20/10* | (2022.01) |
| *G06V 40/16* | (2022.01) |

(56) References Cited

U.S. PATENT DOCUMENTS

| | | | | |
|---|---|---|---|---|
| 9,025,027 | B2* | 5/2015 | Xue | G01J 3/0229 348/148 |
| 9,423,484 | B2* | 8/2016 | Aycock | G06K 9/209 |
| 9,528,929 | B2* | 12/2016 | Chenault | G01N 33/1833 |
| 9,589,195 | B2* | 3/2017 | Aycock | G06K 9/00288 |
| 9,631,973 | B2* | 4/2017 | Dorschner | G01J 3/2823 |
| 9,741,163 | B2* | 8/2017 | Fest | G01B 11/24 |
| 9,830,506 | B2* | 11/2017 | Short | G01J 5/0025 |
| 9,970,861 | B2* | 5/2018 | Chenault | G06K 9/0063 |
| 9,989,625 | B2* | 6/2018 | Aycock | G01S 5/16 |
| 10,311,285 | B2* | 6/2019 | Pezzaniti | G02B 27/00 |
| 10,365,210 | B2* | 7/2019 | Chenault | G06K 9/2036 |
| 10,395,113 | B2* | 8/2019 | Aycock | G06K 9/00255 |
| 10,408,918 | B2* | 9/2019 | Aycock | G01S 5/0263 |
| 2001/0048078 | A1* | 12/2001 | Stair | G01N 21/21 250/340 |
| 2005/0264813 | A1* | 12/2005 | Giakos | B82Y 20/00 356/369 |
| 2006/0164643 | A1* | 7/2006 | Giakos | G01J 3/36 356/369 |
| 2008/0088842 | A1* | 4/2008 | Schultz | G01J 4/04 356/367 |
| 2008/0165359 | A1* | 7/2008 | Mattox | G01J 4/04 356/367 |
| 2010/0073753 | A1* | 3/2010 | Kimura | G06K 9/00825 359/246 |
| 2011/0169943 | A1* | 7/2011 | Bachman, II | G08G 5/045 348/117 |
| 2012/0069181 | A1* | 3/2012 | Xue | G01J 3/447 348/148 |
| 2012/0075473 | A1* | 3/2012 | Sarwar | G01J 4/00 348/156 |
| 2012/0075513 | A1* | 3/2012 | Chipman | G01J 4/04 348/302 |
| 2012/0089332 | A1* | 4/2012 | Hong | G01V 8/00 702/2 |
| 2013/0027555 | A1* | 1/2013 | Meadow | 348/144 |
| 2013/0258173 | A1* | 10/2013 | Nakamura | H04N 5/2254 348/360 |
| 2013/0293871 | A1* | 11/2013 | Gruev | G01J 4/04 356/73 |
| 2014/0078298 | A1* | 3/2014 | Kudenov | G01J 3/0208 348/135 |
| 2014/0247361 | A1* | 9/2014 | Sarwar | G06K 9/00255 348/156 |
| 2015/0168210 | A1* | 6/2015 | Dorschner | G01J 3/0224 349/18 |
| 2015/0219498 | A1* | 8/2015 | Tillotson | G01J 4/04 348/144 |
| 2015/0226827 | A1* | 8/2015 | Aycock | G01S 3/783 382/103 |
| 2016/0061665 | A1* | 3/2016 | Chenault | G06K 9/2036 356/51 |
| 2016/0088238 | A1* | 3/2016 | Greenway | G01J 3/50 348/164 |
| 2016/0232709 | A1* | 8/2016 | Videen | H04N 5/33 |
| 2016/0253551 | A1* | 9/2016 | Pezzaniti | G02B 5/201 382/118 |
| 2016/0307053 | A1* | 10/2016 | Aycock | G06K 9/209 |
| 2017/0132458 | A1* | 5/2017 | Short | G06K 9/00255 |
| 2017/0178399 | A1* | 6/2017 | Fest | G06T 7/70 |
| 2017/0184700 | A1* | 6/2017 | Aycock | G01S 3/7861 |
| 2017/0299501 | A1* | 10/2017 | Chenault | G01N 25/00 |
| 2018/0005012 | A1* | 1/2018 | Aycock | G06K 9/0063 |
| 2018/0100731 | A1* | 4/2018 | Pau | H04N 9/04555 |
| 2018/0259617 | A1* | 9/2018 | Aycock | G06K 9/00671 |
| 2018/0328836 | A1* | 11/2018 | Chenault | G01N 25/00 |
| 2020/0012119 | A1* | 1/2020 | Pezzaniti | G02B 27/285 |
| 2020/0088583 | A1* | 3/2020 | Acker | G01N 21/211 |
| 2020/0110022 | A1* | 4/2020 | Chenault | G01N 25/00 |
| 2020/0184233 | A1* | 6/2020 | Berberian | G06K 9/00798 |

* cited by examiner

Fig. 9a
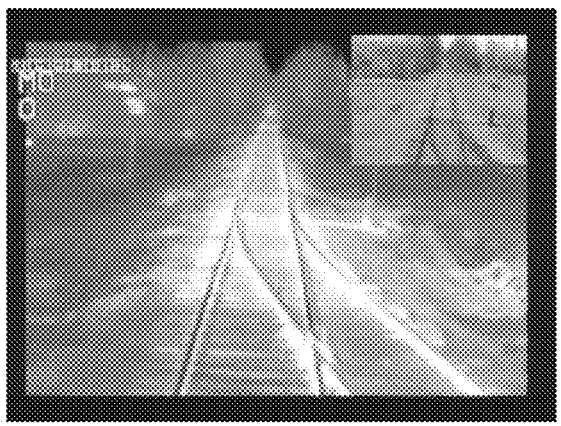
Fig. 9b				Fig. 9c
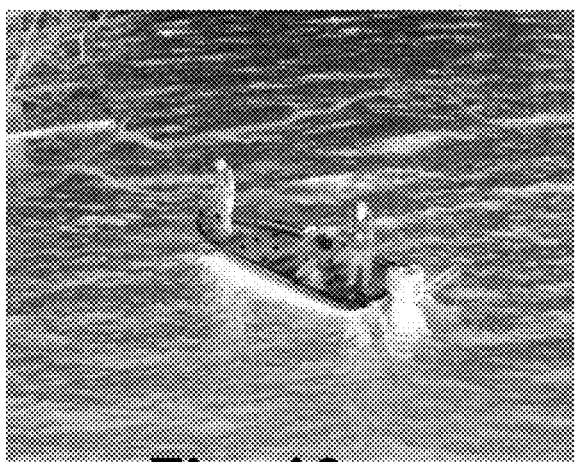
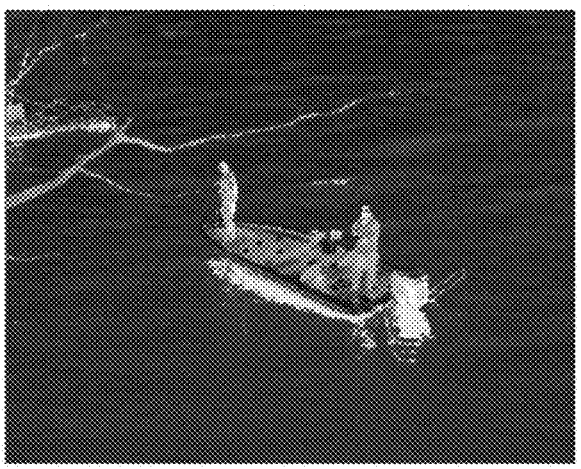
Fig. 10a				Fig. 10b
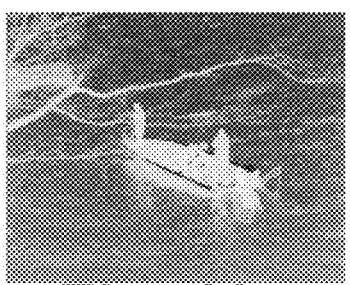
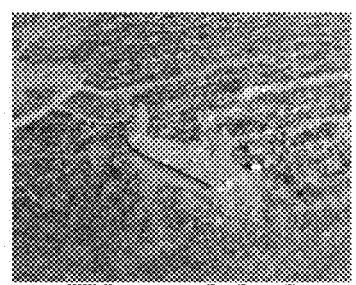
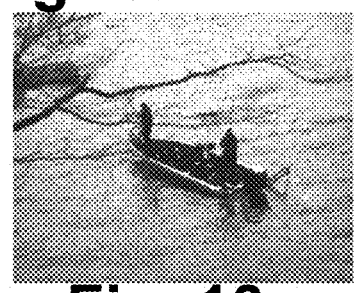
Fig. 10c		Fig. 10d		Fig. 10e

POLARIZATION-BASED MAPPING AND PERCEPTION METHOD AND SYSTEM

REFERENCE TO RELATED APPLICATIONS

This application is a continuation of U.S. Non-Provisional application Ser. No. 15/450,948 (issuing as U.S. Pat. No. 10,395,113), titled "Polarization-based Mapping and Perception System and Method," which is a continuation-in-part of U.S. Non-provisional application Ser. No. 14/836,549 (issued as U.S. Pat. No. 9,589,195), which claimed the benefit of and priority to Provisional Patent Application U.S. Ser. No. 62/041,778, entitled "Polarization-based Mapping and Perception System and Method," and further which was a continuation-in-part of U.S. Non-Provisional application Ser. No. 14/602,823, entitled "Polarization Imaging for Facial Recognition Enhancement System and Method," which claimed the benefit of U.S. Provisional Application No. 61/930,272. All of the afore-mentioned applications are incorporated herein by reference.

GOVERNMENT LICENSE RIGHTS

This invention was made with government support under Contract Number W911QX-17-C-0016 awarded by the U.S. Department of the Army. The government has certain rights in the invention.

BACKGROUND AND SUMMARY

As used herein, Long Wave Infrared is referred to as "LWIR" or "thermal." As used herein, "mapping" refers to placing objects in a scene relative to other objects or elements in the scene. As an example, "that little rock is in the road next to that big rock just off the road." As used herein, "roadway" refers to any path along which a person, animal, or vehicle may traverse.

A method of using Long Wave Infrared Imaging Polarimetry for improved mapping and perception of a roadway or path and for perceiving or detecting objects is disclosed herein. The described method is not tied to any one specific polarimeter sensor architecture, and thus the method described pertains to all LWIR sensors capable of detecting the critical polarimetric signature. The method comprises recording raw image data of an area using a polarimeter to obtain polarized images of the area. The images are then corrected for non-uniformity, optical distortion, and registration in accordance with the procedure necessitated by the sensor's architecture. IR and polarization data products are computed, and the resultant data products are converted to a multi-dimensional data set for exploitation. Contrast enhancement algorithms are applied to the multi-dimensional imagery to form enhanced object images. The enhanced object images may then be displayed to a user, and/or an annunciator may announce the presence of an object. Further, the vehicle may take evasive action based upon the presence of an object in the roadway.

A standard IR camera gives information about an IR signature (i.e., how bright a target looks), spatial information (i.e., where a target is in the scene), and temporal information (i.e., how the target changes in the scene from frame to frame). A polarimetric system and method as disclosed herein provides all of this information and also a polarimetric signature.

DESCRIPTION OF THE DRAWINGS

The patent or application file contains at least one drawing executed in color. Copies of this patent or patent application publication with color drawings will be provided by the Office upon request and payment of the necessary fee.

FIG. 5b is a thermal image of the roadway of FIG. 5a.

FIG. 7b is a thermal image of the road of FIG. 7a.

FIG. 7c is a contrast enhanced thermal image of the road of FIG. 7a.

FIG. 7d is a polarization image of the road of FIG. 7a.

FIG. 8b is a thermal image of the road FIG. 8a.

FIG. 8c is a contrast enhanced thermal image of the road of FIG. 8a.

FIG. 8d is a polarization image of the road of FIG. 8a.

FIG. 9a depicts a visible image of train tracks.

FIG. 9b is a thermal image of the train tracks of FIG. 9a.

FIG. 9c is a polarization image of the train tracks of FIG. 9c.

FIG. 10a is a Stokes vector image $S_0$ of a maritime scene showing fishermen in a boat.

FIG. 10b is a ColorFuse image of the scene of FIG. 10a.

FIG. 10c is a Stokes vector images $S_1$ of the maritime of FIG. 10a.

FIG. 10d is a Stokes vector images $S_2$ of the maritime of FIG. 10a.

FIG. 10e is a DoLP image of the maritime scene of FIG. 10a.

DETAILED DESCRIPTION

Figure 1:
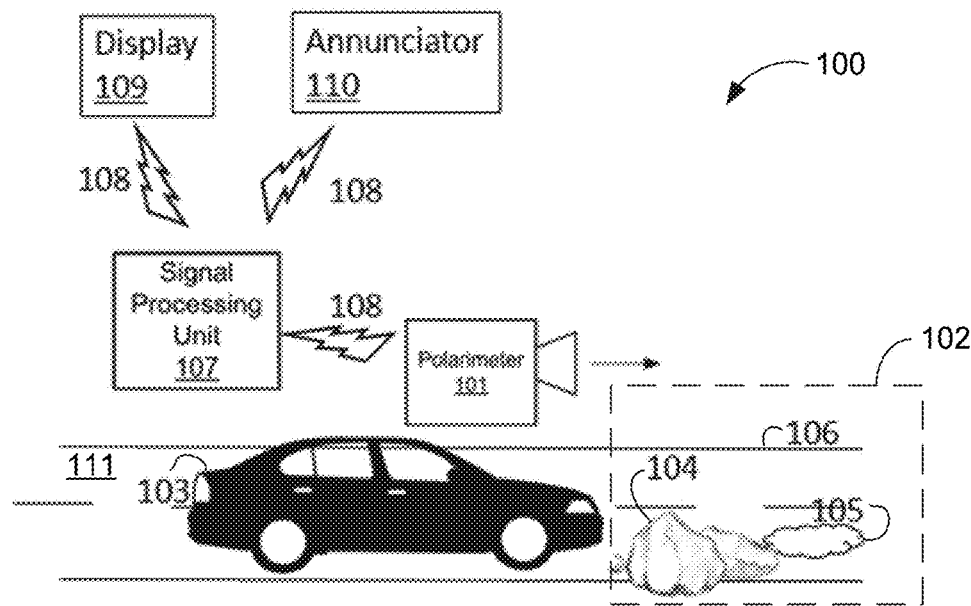
FIG. 1 is a block diagram illustrating a system in accordance with an exemplary embodiment of the present disclosure.

FIG. 1 illustrates a system 100 in accordance with an exemplary embodiment of the present disclosure. The system 100 comprises a polarimeter 101 mounted on a vehicle 103 and a signal processing unit 107, which collect and analyze images of a surface 111 for detection and annunciation of an object 102. Exemplary objects 102 shown in FIG. 1 include an obstacle 104, water or mud puddle 105, and a roadway edge 106. As used in this disclosure, the term "object" may refer to any object, pathway defect or area of interest, including in some embodiments humans or other animals. In FIG. 1, the obstacle 104 and the puddle 105 are objects the vehicle would want to avoid. The roadway edge 106 is an object that the vehicle would want to know the location of, in order to stay on a roadway. Thus in some embodiments, the objects 102 are objects to be avoided or located in order to safely navigate the vehicle 103. In other embodiments, the objects 102 are items in need of location, for example, humans during search and rescue operations, as further discussed herein.

The polarimeter 101 comprises a polarizing imaging device for recording polarized images, such as a digital camera or thermal imager that collects images. The vehicle 103 may be an automobile, watercraft, aircraft, or any navigable vehicle, or a human on foot. The polarimeter 101 collects raw image data of the roadway environment consisting of the surface 111 (a roadway, for example), and objects 102 such as the obstacle 104, the water or mud puddle 105, and the roadway edge 106.

The polarimeter 101 transmits raw image data to the signal processing unit 107, which processes the data as further discussed herein. The processed data is then displayed to the operator on display 108 or detection is annunciated on an annunciator 110, as further discussed herein. Although FIG. 1 shows the polarimeter 101, the signal processing unit 107, the display 109, and annunciator 110 as separate items, the polarimeter 101 and signal processing unit 107 are packaged into one device in certain embodiments and placed on the vehicle 103 such that the polarimeter has a view of the roadway, and with the display 109 and annunciator 110 packaged together and placed inside the vehicle.

In the illustrated embodiment, the polarimeter 101 sends raw image data (not shown) to the signal processing unit 107 over a network or communication channel 108 and processed data sent to the display 109 and annunciator 110. The signal processing unit 107 may be any suitable computer known in the art or future-developed. The signal processing unit 107 receives the raw image data, filters the data, and analyzes the data as discussed further herein to provide enhanced imagery and detections and annunciations. The network 108 may be of any type network or networks known in the art or future-developed, such as a simple communications cable, the internet backbone, Ethernet, Wifi, WiMax, broadband over power line, coaxial cable, and the like. The network 108 may be any combination of hardware, software, or both. Further, the network 108 could be resident in a sensor (not shown) housing both the polarimeter 101 and the signal processing unit 107.

In another exemplary embodiment (not shown), the vehicle 103 comprises manned or unmanned (autonomous) agricultural equipment in a farming environment and the objects 102 include obstacles along farm roads or in fields. In another embodiment, the vehicle 103 comprises manned or unmanned (autonomous) vessels that operate on waterways or oceans and the objects 102 are floating in the water. In another exemplary embodiment (not shown), the vehicle 103 comprises a person or vessel conducting search and rescue activities and objects 102 are victims of an incident involving bodies of water. In another exemplary embodiment (not shown), the vehicle 103 comprises manned or unmanned (autonomous) aircraft and objects 102 are those found in an airfield environment, including runways and the grassy areas in and around runways, or elsewhere on the ground. In another exemplary embodiment (not shown), the vehicle 103 comprises railroad equipment and the objects 102 are those found in the environment around railroad tracks and switches.

Figure 2:
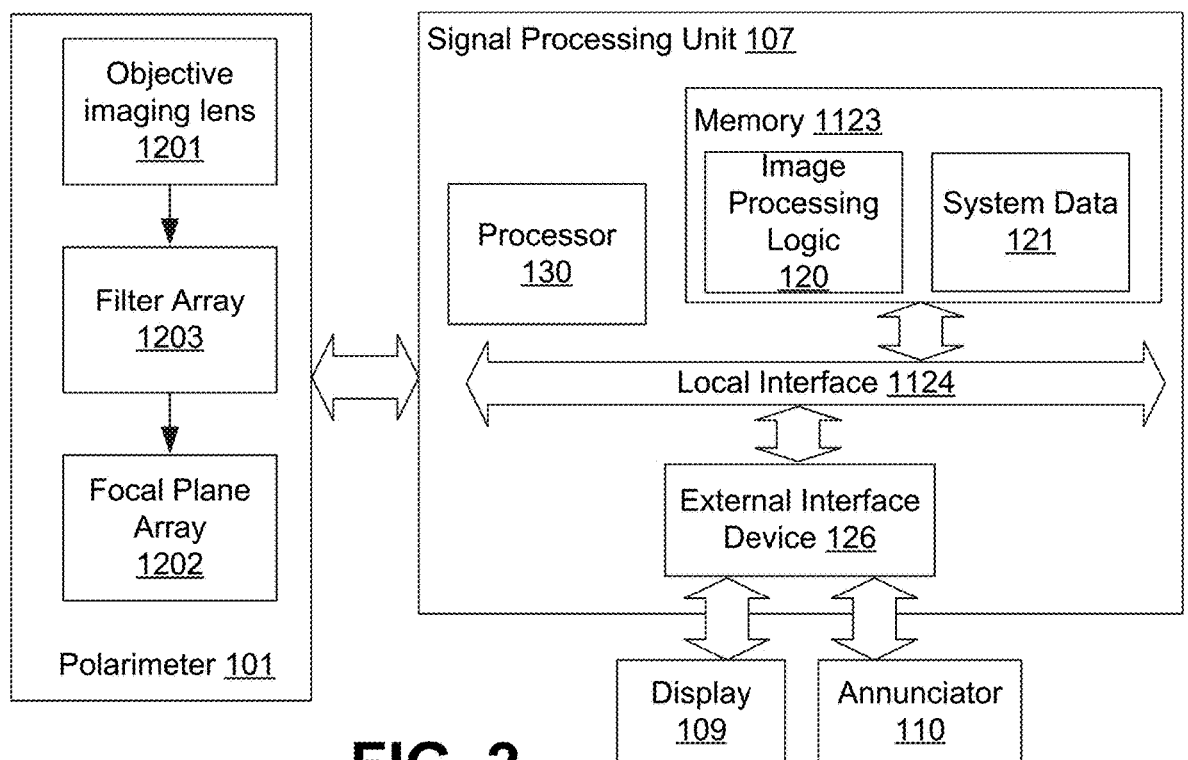
FIG. 2 depicts an exemplary polarimeter and signal processing unit as depicted in FIG. 1.

FIG. 2 depicts an exemplary polarimeter 101 and signal processing unit 107 according to an embodiment of the present disclosure. The polarimeter 101 comprises an objective imaging lens 1201, a filter array 1203, and a focal plane array 1202. The objective imaging lens 1201 comprises a lens pointed at the surface 111 (FIG. 1). The filter array 1203 filters the images received from the objective imaging lens system 1201. The focal plane array 1202 comprises an array of light sensing pixels.

The signal processing unit 107 comprises image processing logic 120 and system data 121. In the exemplary signal processing unit 107 image processing logic 120 and system data 121 are shown as stored in memory 1123. The image processing logic 120 and system data 121 may be implemented in hardware, software, or a combination of hardware and software.

The signal processing unit 107 also comprises a processor 130, which comprises a digital processor or other type of circuitry configured to run the image processing logic 120 by processing the image processing logic 120, as applicable. The processor 130 communicates to and drives the other elements within the signal processing unit 107 via a local interface 1124, which can include one or more buses. When stored in memory 1123, the image processing logic 120 and the system data 121 can be stored and transported on any computer-readable medium for use by or in connection with logic circuitry, a processor, an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
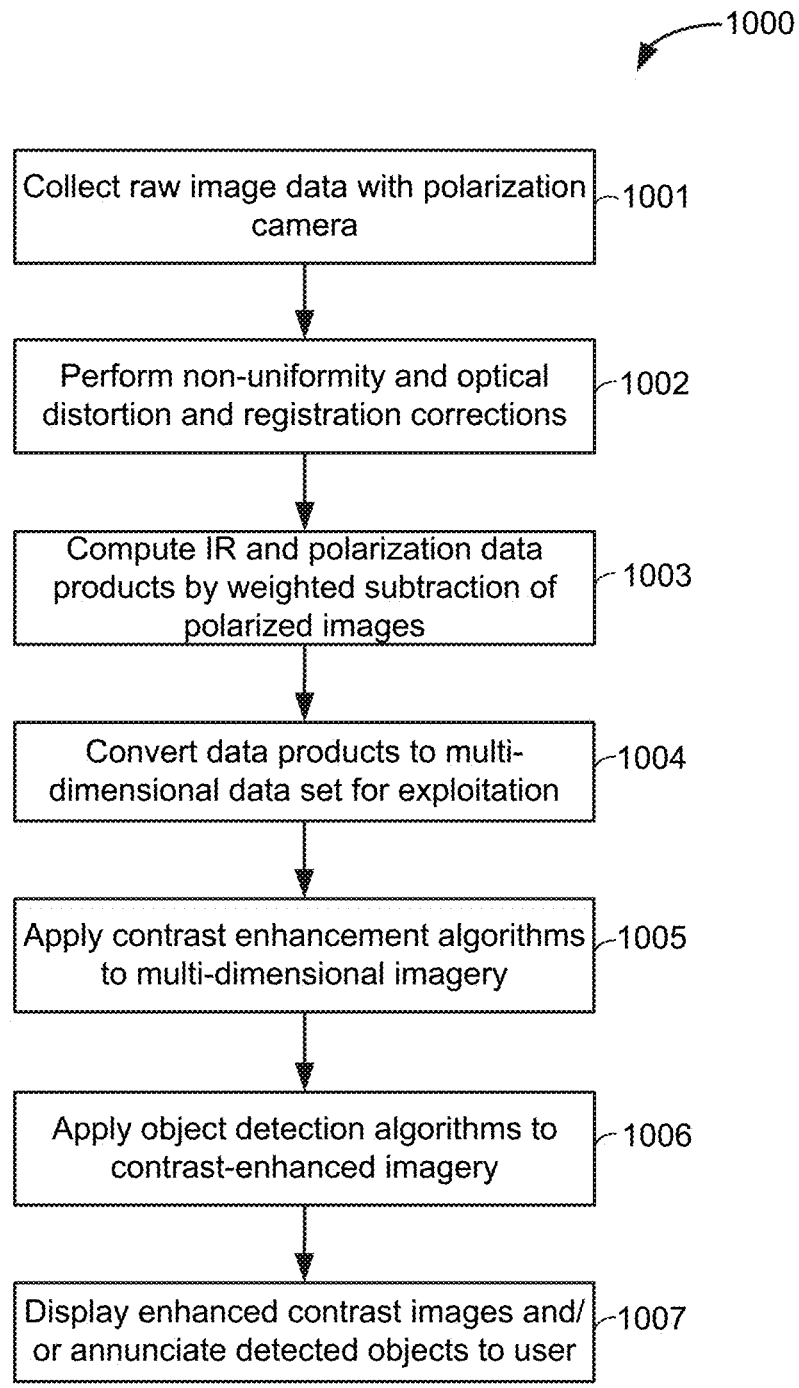
FIG. 3 is a flowchart depicting exemplary architecture and functionality of the system logic in accordance with an exemplary embodiment of the disclosure.

Exemplary system data 121 is depicted comprises:
a. Raw image data (not pictured) from the polarimeter 101 (FIG. 2) obtained from step 1001 of the method 100 (FIG. 3).
b. Corrected image data (not pictured), which is the data that has been corrected for non-uniformity, optical distortion, and registration per step 1002 of the method 1000 (FIG. 3).
c. Thermal (IR) and Polarization images obtained from step 1003 of the method 1000 (FIG. 3).
d. Conversion of polarization and thermal data to multi-dimensional image data applied in step 1004 of the method 1000 (FIG. 3).
e. Contrast enhancing algorithms applied to image data in step 1005 of the method 1000 (FIG. 3).
f. Object detection algorithms applied to contrast enhanced image data in step 1006 of the method 1000 (FIG. 3).

g. Image data applied to the display 109 and annunciator 110 in step 1007 of the method 1000 (FIG. 3).

h. Thermal image data as described herein.

i. Hybrid thermal/polarization images as described herein.

The image processing logic 120 executes the processes described herein with respect to FIG. 3.

Referring to FIG. 2, an external interface device 126 connects to and communicates with the display 109 and annunciator 110. The external interface device 126 may also communicate with or comprise an input device, for example, a keyboard, a switch, a mouse, a touchscreen, and/or other type of interface, which can be used to input data from a user of the system 100. The external interface device 126 may also or alternatively communicate with or comprise a personal digital assistant (PDA), computer tablet device, laptop, portable or non-portable computer, cellular or mobile phone, or the like. The external interface device 126 may also or alternatively communicate with or comprise a non-personal computer, e.g., a server, embedded computer, field programmable gate array (FPGA), microprocessor, or the like.

The external interface device 126 is shown as part of the signal processing unit 107 in the exemplary embodiment of FIG. 2. In other embodiments, the external interface device 126 may be outside of the signal processing unit 107.

The display device 109 may consist of a tv, led screen, monitor or any electronic device that conveys image data resulting from the method 1000 or is attached to a personal digital assistant (PDA), computer tablet device, laptop, portable or non-portable computer, cellular or mobile phone, or the like. The annunciator device 110 can consist of a warning buzzer, bell, flashing light, or any other auditory or visual or tactile means to warn the operator of the detection of an object or obstacle.

In some embodiments, autonomous action may be taken based upon the objects 102 (FIG. 1) detected. For example, the vehicle 103 (FIG. 1) may automatically be directed to avoid objects 102. In this regard, the external interface device 126 may interface with the vehicle 103 such that the processor 130 may direct the vehicle to swerve around an object 102. In some cases where automatic action is taken, the annunciator 110 may not be required.

In other embodiments, a Global Positioning System ("GPS") device (not shown) may interface with the external interface device 126 to provide a position of the objects 102 detected.

In the illustrated embodiment, the display 109 and annunciator 110 are shown as separate, but the annunciator 110 may be combined with the display 109, and in another embodiments, annunciation could take the form of highlighted boxes or regions or another means used to highlight the object as part of the image data display. For example, an indicator box (e.g., a red box (not shown)), can provides a visual indication of an object 102 detected.

FIG. 3 is a flowchart depicting exemplary architecture and functionality of the image processing logic 120 (FIG. 2) in accordance with a method 1000. In step 1001 of the method 1000, the polarimeter 101 captures an image of a roadway scene from a vehicle on a roadway 111 (FIG. 1) and sends raw image data to the signal processing unit 107 (FIG. 1).

In step 1002, the signal processing unit 107 (FIG. 1) corrects imager non-uniformity of the images received from the polarimeter 101. Examples of imager non-uniformity include fixed pattern lines in the image, noisy pixels, bad pixels, bright spots, and the like. Algorithms that are known in the art may be used for correcting the imager non-uniformity. In some embodiments, step 1002 is not performed because the imager non-uniformity does not require correction.

Additionally in step 1002, the signal processing unit 107 removes image distortion from the image data. An example of image distortion is warping at the edges of the image caused by the objective imaging lens system. Algorithms that are known in the art may be used for correcting image distortion. Registration corrections may also be performed in step 1002, using methods known in the art.

In step 1003, IR and polarization data products are computed. In this step, Stokes parameters ($S_0$, $S_1$, $S_2$) are calculated by weighted subtraction of the polarized image obtained in step 1002. The LWIR imaging polarimeter measures both a radiance image and a polarization image. A radiance image is a standard image whereby each pixel in the image is a measure of the radiance, typically expressed in Watts/cm2-sr, reflected or emitted from that corresponding pixel area of the scene. Standard photographs and thermal images are radiance images, simply mappings of the radiance distribution emitted or reflected from the scene. A polarization image is a mapping of the polarization state distribution across the image. The polarization state distribution is typically expressed in terms of a Stokes image.

Of the Stokes parameters, $S_0$ represents the conventional LWIR thermal image with no polarization information. $S_1$ and $S_2$ display orthogonal polarimetric information. Thus the Stokes vector, first introduced by G. G. Stokes in 1852, is useful for describing partially polarized light and is defined as $$\vec{S} = \begin{bmatrix} s_0 \\ s_1 \\ s_2 \\ s_3 \end{bmatrix} = \begin{bmatrix} I_0 + I_{90} \\ I_0 - I_{90} \\ I_{45} - I_{135} \\ I_R - I_L \end{bmatrix} \quad (1)$$

Where $I_0$ is the radiance that is linearly polarized in a direction making an angle of 0 degrees with the horizontal plane, $I_9$ is radiance linearly polarized in a direction making an angle of 90 degrees with the horizontal plane. Similarly $I_{45}$ and $I_{135}$ are radiance values of linearly polarized light making an angle of 45° and 135° with respect to the horizontal plane. Finally $I_R$ and $I_L$ are radiance values for right and left circularly polarized light. For this invention, right and left circularly polarized light is not necessary and the imaging polarimeter does not need to measure these states of polarization. For this reason, the Stokes vectors that we consider will be limited to the first 3 elements which express linearly polarized light only, $$\vec{S} = \begin{bmatrix} s_0 \\ s_1 \\ s_2 \end{bmatrix} = \begin{bmatrix} I_0 + I_{90} \\ I_0 - I_{90} \\ I_{45} - I_{135} \end{bmatrix} \quad (2)$$

Another useful form of equation (2) is a normalized form of the equation given by $$\vec{s} = s_0 \begin{bmatrix} 1 \\ s_1/s_0 \\ s_2/s_0 \end{bmatrix} = (I_0 + I_{90}) \begin{bmatrix} 1 \\ (I_0 - I_{90})/(I_0 + I_{90}) \\ (I_{45} - I_{135})/(I_0 + I_{90}) \end{bmatrix} \quad (3)$$

The polarization state emitted or reflected from the roadway surface, surfaces to the side of the road, and objects or surfaces in the road depends on a number of factors including the angle of emission, the surface temperature of the surface, the micro-roughness of the surface (texture), the complex refractive index of the surface and the background temperature of the surrounding environment. The invention here primarily makes use of the fact that the polarization state of light emitted and reflected from the surfaces and objects is a function of angle of emission and different surface texture.

The emissivity of an object is determined from Kirchoff's radiation law. The most familiar form of Kirchoff's law is gives the emissivity of a surface E in terms of the reflectance r, given by $$\varepsilon(\theta,\phi) = 1 - r(\theta) \quad (4)$$

where $\theta$ is the angle between the surface normal and the camera's line of sight. The more general equations for Kirchoff's law are given by $$\varepsilon_p(\theta) = 1 - r_p(\theta) \quad (5)$$

and $$\varepsilon_s(\theta) = 1 - r_s(\theta) \quad (6)$$

where the subscripts p and s denote the emissivity and reflectance of particular polarization states. The p-state indicates the plane of emission for light that is linearly polarized in a plane that contains the surface normal and the line of sight to the camera. For example, if the camera is looking down at a horizontal surface, the p-state of polarization would appear vertically polarized. The s-state of polarization is perpendicular to the p-state. Note that we have suppressed the temperature and wavelength dependence in equations 4-6.

Substituting equations (5) and (6) into equation (3) gives $$\vec{s} = s_0 \begin{bmatrix} 1 \\ P(\theta)\cos(\phi) \\ P(\theta)\sin(\phi) \end{bmatrix} \quad (7)$$

where $\phi$ is the angle that the plane of incidence makes with the horizontal plane and $$P(\theta) = \left( \frac{\varepsilon_s(\theta) - \varepsilon_p(\theta)}{\varepsilon_s(\theta) + \varepsilon_p(\theta)} \right) \quad (8)$$

Equation 8 can be written out more explicitly as $$P(\theta) = \left( \frac{1 - r_s(\theta) - (1 - r_p(\theta))}{1 + r_s(\theta) + 1 + r_p(\theta)} \right) = \left( \frac{r_p(\theta) - r_s(\theta)}{2 + r_p(\theta) + r_s(\theta)} \right) \quad (9)$$

where $r_p$ and $r_s$ are given by the Fresnel equations for reflection $$r_p = \sqrt{\frac{n^2\cos(\theta) - \sqrt{n^2 - \sin^2(\theta)}}{n^2\cos(\theta) + \sqrt{n^2 - \sin^2(\theta)}}} \quad (9a)$$

$$r_s = \sqrt{\frac{\cos(\theta) - \sqrt{n^2 - \sin^2(\theta)}}{\cos(\theta) + \sqrt{n^2 - \sin^2(\theta)}}} \quad (9b)$$

Note that $P(\theta)$ does not explicitly depend on the angle $\phi$ that the plane of incidence makes with the horizontal plane. The angle $\phi$ is critical to determine the orientation of plane of incidence and ultimately the azimuthal angle of the surface normal. The angle $\phi$ can be determined from the following angle, $$\phi = \arctan\left(\frac{s_2}{s_1}\right) \quad (10)$$

The angle $\theta$ can be determined a number of ways. A method for determining $\theta$ and $\phi$ from a normalized Stokes image (Equation 3) are known in the art.

Also in step 1003, a degree of linear polarization (DoLP) image is computed from the Stokes images. A DoLP image is useful for providing contrast for roadway surface and objects in the road, and can be calculated as follows:

$$DoLP = \sqrt{(s_1/s_0)^2 + (s_2/s_0)^2} \quad (11)$$

or $$DoLP = \left( \frac{\varepsilon_s(\theta) - \varepsilon_p(\theta)}{\varepsilon_s(\theta) + \varepsilon_p(\theta)} \right) = \left( \frac{r_p(\theta) - r_s(\theta)}{2 + r_p(\theta) + r_s(\theta)} \right) \quad (12)$$

Note that DoLP is linear polarization. As one with skill in the art would know, in some situations polarization that is not linear (e.g., circular) may be desired. Thus in other embodiments, step 1004 may use polarization images derived from any combination of $S_0$, $S_1$, $S_2$, or $S_3$ and is not limited to DoLP.

The DoLP image is one available image used to view polarization contrast in an image. Another alternative image to view polarization content is a "ColorFuse" image that is generated by mapping the radiance, DoLP, and orientation images to a color map. Persons with skill in the art makes the following mapping of polarization data to a hue-saturation-value representation for color:

$S_0$=value

DoLP=saturation

Orientation $\phi$=hue

This representation enables display of all optical information (radiance and polarization) in a single image and provides a means to show both radiometric and polarization contrast enhancing understanding of the scene. In many cases where polarization contrast is strong, this representation provides scene context for the surfaces or objects that are polarized. Those experienced in the art can imagine other ways of doing this.

The ColorFuse is one embodiment of multidimensional representation that can be produced in step 1004. Those knowledgeable in the art can conceive similar mappings. For one example, the DoLP information may be emphasized when radiance values are low.

As mentioned above, the polarization state emitted or reflected from the surface of objects or surfaces in the imaged scene depends on a number of factors including the angle of emission, the surface temperature of the surface, the micro-roughness or texture of the surface, and the complex refractive index of the surface. Generally speaking then, the contrast of surfaces and objects in the scene due to polarization are dependent on the geometry and the material or surface properties of the objects in the scene. While surface temperature contributes to polarization signature contrast, temperature differences of objects in the scene are not necessary in order for there to be polarization contrast. This is important because frequently many objects in an imaged scene can be at the same or very similar temperatures and hence show little contrast.

Because the underlying optical radiation depends on emission, no additional light sources, illumination, or ambient light is required for polarization imaging. This is a key point and differentiates this approach from all of the prior art. Further, the approach works equally well during the night time as it does during the day.

In step 1005, contrast enhancing algorithms that are known in the art are applied to the multidimensional image from step 1004. The multi-dimensional data exploits the polarization data to significantly enhance the information content in a scene. Non-restrictive examples include global mean, variance, and higher order moment analysis, Principal Component Analysis, or Linear Discriminate Analysis, computation of the statistics of the multidimensional data as a whole and then computation of local values based on a kernel convolved with the image as a whole and then normalized by global statistics of the scene.

In step 1006, object detection algorithms that are known in the art are applied to the contrast enhanced data from step 1005. Non-restrictive examples of object detection algorithms include setting manually or automatically a threshold value based on the image statistics, segmenting portions of the image based on the contrast enhancements, edge detection, and morphological properties.

In step 1007, detected objects may then be annunciated to the user through visual or auditory means. Non-restrictive examples includes bells, buzzers or lights to draw the operator's attention to the display, or indications on the display such as distinctive colors or boxes in the region of the obstacle or surface. In addition or alternatively, in step 1007 enhanced contrast images may be displayed to the user (not shown).

In other embodiments, steps 1003, 1004, 1005, and 1006 are used in combinations that omit one or more of the steps. In other embodiments, the polarization image data, or the multi-dimensional (ColorFuse) data, may be viewed by humans for object detection, and no algorithms are applied.

Algorithms that exploit a combination of image features extracted from a LWIR imaging polarimeter can be used to detect potential obstacles or roadway edges. In the case of train tracks, algorithms could be used to confirm continuity of the tracks automatically. Once potential noteworthy features are detected, they can be automatically highlighted for the operator, and a warning can be given through some annunciation mechanism (buzzer or light). Algorithms could also potentially be used to exploit the orientation information to help improve understanding of the image such as segmentation or shape recognition.

For the purposes of operating a vehicle, the enhanced contrast enables the mapping of features in the imaged scene that, through operator perception or automated detection and warning, improves the safety of the operator, or in the case of autonomously operated equipment such as agricultural equipment, provides autonomous obstacle avoidance to the steering or navigation systems. Specifically, improved detection and recognition of obstacles will allow the operator to maneuver the vehicle (or vessel) to avoid obstacles. Improved detection and perception of roadway edges will reduce chances of inadvertently leaving the roadway. This is especially true at night when the operator's vision is limited by darkness.

As discussed herein, the system and method of the present disclosure adds a polarimetric signature to the information that was previously attainable by an IR camera, i.e., temporal, special and IR signature. These four categories of information can be used simultaneously to classify/categorize objects detected. Further, the classification/categorization of the detected objects can influence evasive action to be taken by a vehicle. For example, a detected object in a roadway may be classified as an obstacle that needs to be avoided, rather than a pothole the vehicle is capable of driving over. Further, multiple objects may be independently and simultaneously classified into separate groups or subgroups based on their temporal, spatial, IR, and/or polarimetric signatures in accordance with given criteria.

Figure 4A:
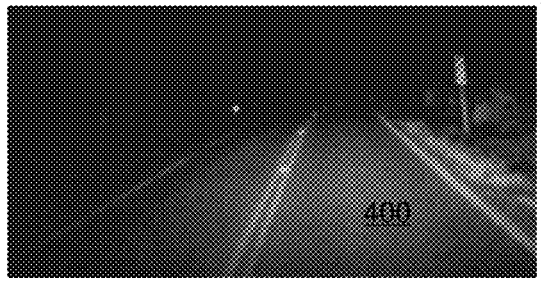
FIG. 4a depicts a visible image of a roadway at night.
Figure 4B:
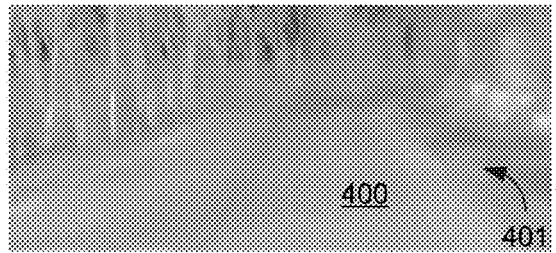
FIG. 4b is a thermal image of the same roadway at night.
Figure 4C:
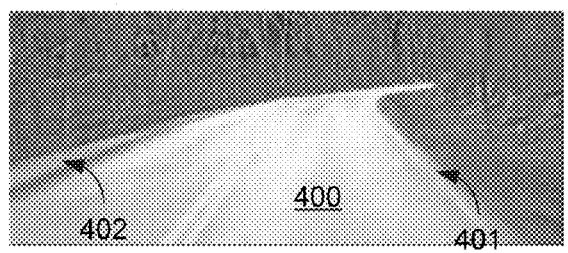
FIG. 4c depicts a polarization image of the roadway obtained with the system and method according to an exemplary embodiment of the present disclosure.

FIG. 4*a* depicts a visible image of a roadway 400 at night. FIG. 4*b* is a thermal image of the same roadway 400 at night. Note that in FIG. 4*b*, the roadway 400 and surrounding terrain have nearly the same temperature and hence there is little contrast between the roadway 400 and a shoulder 401 of the road in the thermal image. FIG. 4*c* depicts a polarization image of the roadway 400 obtained with the system and method according to an exemplary embodiment of the present disclosure. The polarization image in 4*c* shows strong contrast of the road 400 and the shoulder 401 is easily discernable. A white stripe 402 that parallels the roadway 400 on the left hand side is a sidewalk. The polarization image in 4*c* was obtained with no external light source.

Figure 5A:
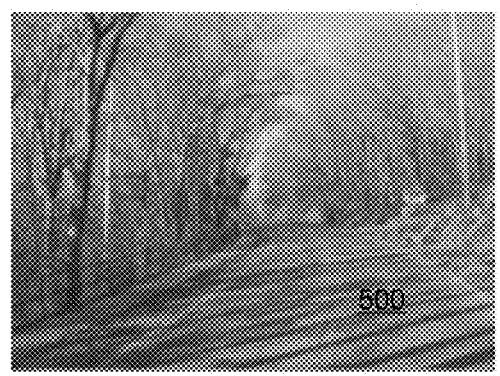
FIG. 5a is a visible image of a roadway during the daytime.
Figure 5B:
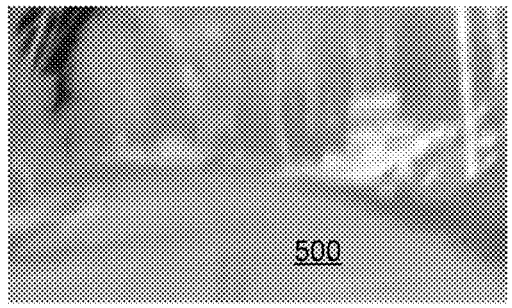
Figure 5C:
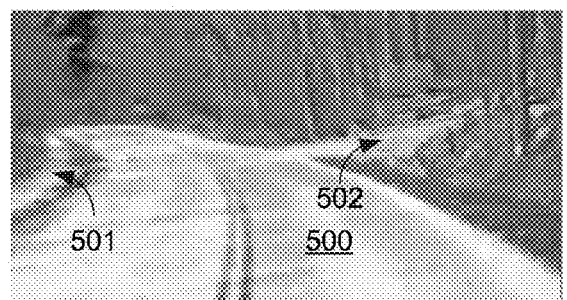
FIG. 5c is a polarization image of the roadway of FIG. 5a obtained with the system and method according to an exemplary embodiment of the present disclosure.

FIG. 5*a* is a visible image of a roadway 500 during the daytime. FIG. 5*b* is a thermal image of the roadway 500 of FIG. 5*a*. The roadway 500 and other scene elements show confusing contrast in the thermal image of FIG. 5*b*. FIG. 5*c* is a polarization image of the roadway 500 of FIG. 5*a* obtained with the system and method according to an exemplary embodiment of the present disclosure. The polarization image of FIG. 5*c* shows strong contrast of only the roadway 500. A sidewalk 501 that parallels the road on the left hand side and a driveway 502 on the right are easily discernable in the polarization image of FIG. 5*c*. The sidewalk 501 and the driveway 502 are not easily perceptible in the thermal image of FIG. 5*b*.

Figure 6A:
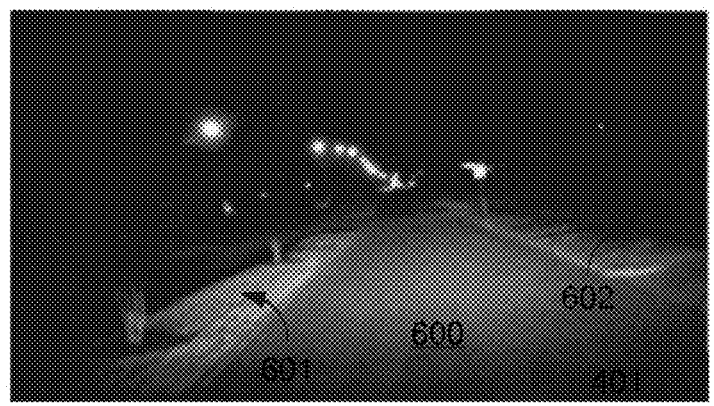
FIG. 6a is a visible image of a roadway that has a median and sidewalk, shown at night.
Figure 6B:
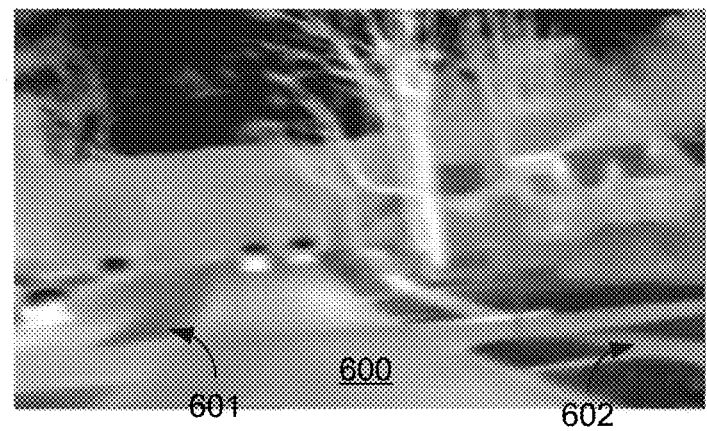
FIG. 6b is a thermal image of the roadway of FIG. 6a, also at night.

FIG. 6*a* is visible image of a roadway 600 that has a median 601 and sidewalk 602, shown at night. FIG. 6*b* is a thermal image of the roadway 600 of FIG. 6*a*, also at night. The roadway and surrounding terrain have similar temperatures and hence there is weak contrast between the roadway and the media of the road in the thermal image.

Figure 6C:
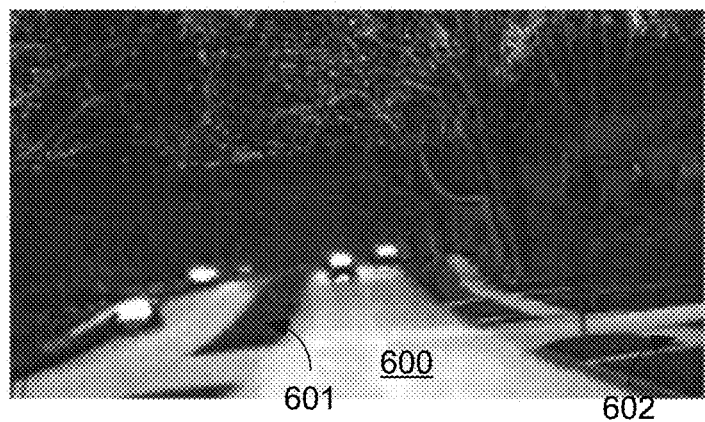
FIG. 6c is a polarization image of the roadway of FIG. 6a obtained with the system and method according to an exemplary embodiment of the present disclosure

FIG. 6*c* is a polarization image of the roadway 600 of FIG. 6*a* obtained with the system and method according to an exemplary embodiment of the present disclosure. The polarization image of FIG. 6*c* shows strong contrast of the roadway 600. The sidewalk 602 that parallels the road on the right hand side and the median 601 are easily discernable in the polarization image of FIG. 6*c*. The sidewalk 602 and the median 601 are not easily perceptible in the thermal image of FIG. 6*b*.

Figure 7A:
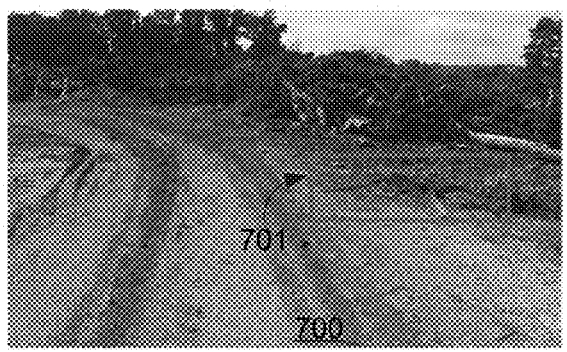
FIG. 7a is a visible image of a dirt road depicting exemplary obstacles on the road.
Figure 7B:
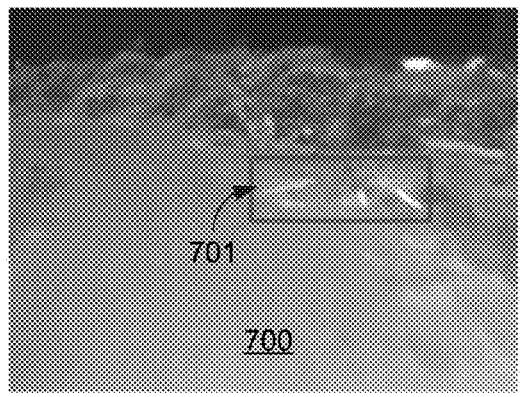
Figure 7C:
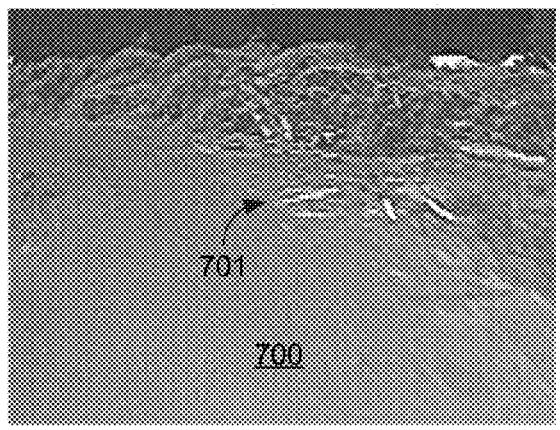

FIG. 7*a* is a visible image of a dirt road 700 depicting exemplary obstacles 701 on a road 700. The obstacles 701 comprise wood planks in the image. FIG. 7*b* is a thermal image of the road 700 of FIG. 7a. In the image of FIG. 7b, the obstacles 701 are easier to discern than in the visible image of FIG. 7a. FIG. 7c is a contrast enhanced thermal image of the road 700 of FIG. 7a.

Figure 7D:
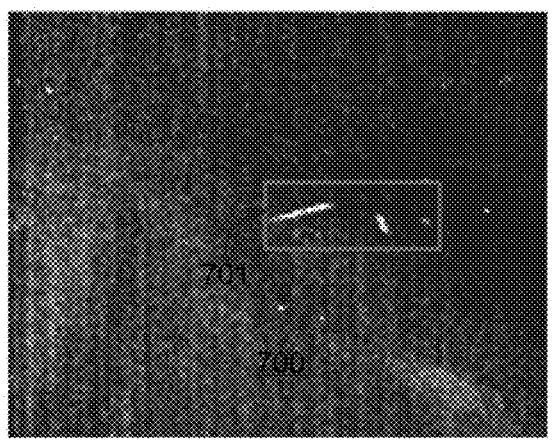
Figure 7E:
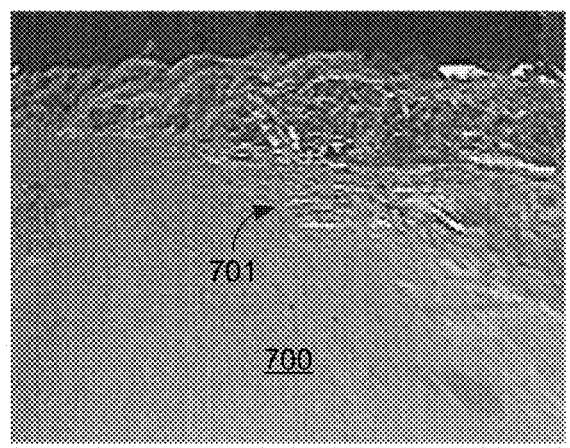
FIG. 7e is a ColorFuse image of the road of FIG. 7d.

FIG. 7d is a polarization image of the road 700 of FIG. 7a. The obstacle 701 in this image is easily discerned, though the polarization image does not provide much context to the obstacle in relation to the road 700. FIG. 7e is a ColorFuse image of the roadway of FIG. 7d. The ColorFuse image shows both thermal and polarimetric data in a single image, and provides the greatest contrast.

Figure 8A:
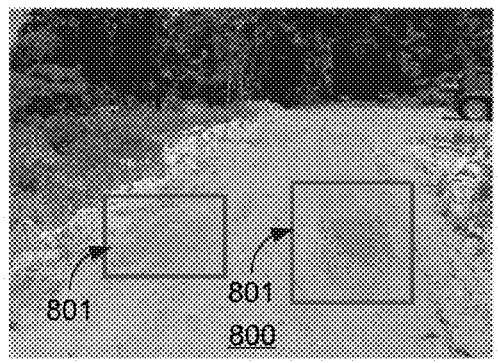
FIG. 8a is a visible image of a dirt road depicting exemplary obstacles the road at night.
Figure 8B:
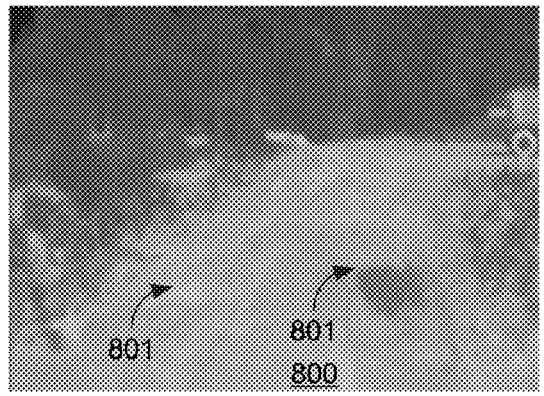
Figure 8C:

FIG. 8a is a visible image of a dirt road 800 depicting exemplary obstacles 801 on a road 800 at night. The obstacles 801 comprise wet dirt and mud in the image. These are potential hazards which might immobilize some ground vehicles. FIG. 8b is a thermal image of the road 800 of FIG. 8a. FIG. 8c is a contrast enhanced thermal image of the road 800 of FIG. 8a.

Figure 8D:
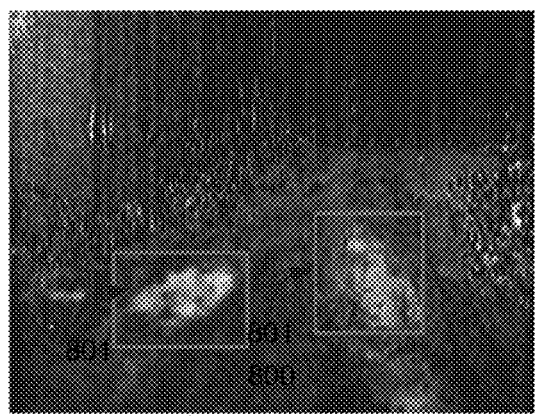
Figure 8E:
FIG. 8e is a ColorFuse image of the roadway of FIG. 8d.

FIG. 8d is a polarization image of the road 800 of FIG. 8a. The obstacles 801 in this image are easily discerned, though the polarization image does not provide much context to the obstacles in relation to the road 800. FIG. 8e is a ColorFuse image of the roadway of FIG. 8d. The ColorFuse image shows both thermal and polarimetric data in a single image, and provides the greatest contrast. The ColorFuse image of FIG. 8e shows how the combination of thermal and polarization data products can be used to provide a good representation of road surfaces.

FIG. 9a (inset photo) is a visible image of train tracks 900 depicting exemplary segmentation of the rails in a railroad environment. FIG. 9b is a thermal image, in which identification of the tracks is difficult due to different temperatures of the objects in areas adjacent to the tracks. FIG. 9c is a polarimetric image of the train tracks 900 of FIG. 9a, and show good delineation of the tracks.

Similarly, for vessels navigating a body of water that need to avoid obstacles in the water, an LWIR polarimeter can be used to enhance contrast between obstacles that break the surface of the water and the water background. This can be particularly effective since objects floating in water tend to have the same temperature as the water they're floating in and can hence be difficult to detect through the radiometric (thermal) image.

FIGS. 10a, 10c, and 10d are Stokes vector images $S_0$, $S_1$ and $S_2$, respectively, of a maritime scene showing fishermen in a boat. FIG. 10e is a DoLP image of the same scene. FIG. 10b is a ColorFuse image of the scene. The ColorFuse image shows improvement in contrast for obstacle avoidance for vessels or advantage for search and rescue.

What is claimed is:

1. A method of detecting an object, the method comprising:
    recording raw image data of an area using a long-wave infrared polarimeter to obtain polarized images of the area;
    processing the polarized images to form processed images by
        calculating Stokes parameters S0, S1, and S2 from the polarized images to create Stokes images by weighted subtraction of the polarized images,
        computing Degree of Linear Polarization (DoLP) images and orientation images from the Stokes images, and
        creating multi-dimensional imagery using one or more of: the polarized images, the Stokes images, the DoLP images and the orientation images;
    enhancing the processed images to form enhanced object images; and
    detecting objects from the enhanced object images.

2. The method of claim 1, wherein the step of recording raw image data of an area using a long-wave infrared polarimeter to obtain polarized images of the area is performed from an aerial vehicle.

3. The method of claim 1, wherein the step of recording raw image data of an area using a long-wave infrared polarimeter to obtain polarized images of the area is performed from a ground-based vehicle.

4. The method of claim 1, further comprising tracking the objects detected.

5. The method of claim 1, further comprising classifying objects detected based upon one or more of: their temporal, spatial, intensity, infrared (IR), or polarimetric signatures, wherein multiple objects may be independently classified into separate groups or sub-groups based upon one or more of: their temporal, spatial, intensity, IR, or polarimetric signatures.

6. A method for detecting objects on the ground from the air, the method comprising:
    recording raw image data of the ground from an aerial vehicle with a long-wave infrared polarimeter to obtain polarized images of the ground;
    processing the polarized images to form processed images by calculating Stokes parameters S0, S1, and S2 from the polarized images to create Stokes images by weighted subtraction of the polarized images, computing Degree of Linear Polarization (DoLP) images and orientation images from the Stokes images, and creating multi-dimensional imagery using one or more of: the polarized images, the Stokes images, the DoLP images and the orientation images;
    enhancing the processed images to form enhanced object images; and
    detecting objects from the enhanced object images.

7. The method of claim 6, further comprising tracking the objects detected.

8. The method of claim 6, further comprising classifying objects detected based upon one or more of: their temporal, spatial, infrared (IR), or polarimetric signatures, wherein multiple objects may be independently classified into separate groups or sub-groups based upon one or more of: their temporal, spatial, IR, or polarimetric signatures.

9. A system for detecting an object on the ground, the system comprising:
    a long-wave infrared polarimeter configured to record raw image data of an area to obtain polarized images of the area; and
    a signal processing unit configured to process the polarized images to form processed images, enhance the processed images to form enhanced object images, and detect objects from the enhanced object images, the signal processing further configured to process the polarized images by calculating Stokes parameters S0, S1, and S2 from the polarized images to create Stokes images by weighted subtraction of the polarized images, by computing Degree of Linear Polarization (DoLP) images and orientation images from the Stokes images, and by creating multi-dimensional imagery using one or more of: the polarized images, the Stokes images, the DoLP images and the orientation images.

10. The method of claim 7, wherein the polarimeter is configured to be installed on and take images from an aerial vehicle.

* * * * *